United States Patent [19]

Christner et al.

[11] 4,115,627

[45] Sep. 19, 1978

[54] ELECTROCHEMICAL CELL COMPRISING A RIBBED ELECTRODE SUBSTRATE

[75] Inventors: Larry G. Christner, Glastonbury, Conn.; Dennis C. Nagle, Catonsville, Md.

[73] Assignee: United Technologies Corporation, Hartford, Conn.

[21] Appl. No.: 824,764

[22] Filed: Aug. 15, 1977

[51] Int. Cl.$^2$ .................................. H01M 4/96
[52] U.S. Cl. ............................................. 429/44
[58] Field of Search ................................. 429/36, 44

[56] References Cited

U.S. PATENT DOCUMENTS

| 3,188,242 | 6/1965 | Kordesch et al. | 429/36 |
| 3,981,745 | 9/1976 | Stedman | 429/21 |

Primary Examiner—John H. Mack
Assistant Examiner—H. A. Feeley
Attorney, Agent, or Firm—Stephen E. Revis

[57] ABSTRACT

A ribbed electrode substrate for an electrochemical cell comprises a gas porous substrate having ribs of hydrophilic material extending across one side thereof. The other side of the substrate is substantially flat and may have a catalyst layer disposed thereon. In one embodiment a stack of fuel cells uses electrodes having these ribbed substrates. A flat, gas impermeable plate separates the electrode substrates of adjacent cells, the ribs of each substrate abutting opposite surfaces of the plate forming channels for carrying reactant gas across the cells. Electrolyte is stored in the ribs, which are hydrophilic. The electrolyte in the ribs moves to and from the electrolyte matrix of the cell by capillary action through the substrate.

1 Claim, 2 Drawing Figures

ELECTROCHEMICAL CELL COMPRISING A RIBBED ELECTRODE SUBSTRATE

BACKGROUND OF THE INVENTION

1. Field of the Invention

This invention relates to electrochemical cell stacks and electrodes used therein.

2. Description of the Prior Art

A fuel cell is an electrochemical cell. A typical fuel cell is comprised of a matrix material for holding electrolyte and an electrode disposed on each side of the matrix and in contact therewith. Reactant gases are fed to the nonelectrolyte facing sides of each electrode. In a stack of fuel cells separator plates are disposed between adjacent cells. The plates have ribs formed on each side thereof. The ribs abut the electrodes of adjacent cells and form U-shaped channels behind the electrodes. Reactant gas is carried to the electrodes via these channels. FIGS. 1 and 2 of commonly owned U.S. Pat. No. 3,994,748 and FIG. 2 of commonly owned U.S. Pat. No. 3,990,913 show fuel cell stack constructions in accordance with the foregoing description. In FIG. 2 of U.S. Pat. No. 3,994,748 it can be seen that each electrode comprises a thin catalyst layer disposed on a somewhat thicker substrate or support layer. The catalyst layer is in direct contact with the matrix, and the substrate contacts the separator plate ribs.

It is known in the art that the electrolyte liquid volume varies depending upon the operating mode of the fuel cell. When the fuel cell is of the type which holds its electrolyte trapped within a matrix, provision must be made for accommodating excess electrolyte volume beyond that which the matrix is capable of holding. A well known solution to this problem is the use of what is called a reservoir layer disposed behind one or both of the electrodes. The reservoir layer acts as a sponge to store excess electrolyte. Wicking paths from the matrix through the electrode to the reservoir layer are typically provided to permit transfer of the electrolyte therebetween as the liquid volume increases and decreases. Commonly owned U.S. Pat. Nos. 3,779,811 and 3,905,832 describe this type of approach to handling liquid volume changes in fuel cells.

Separate reservoir layers and ribs in the separator plate are undesirable from both an economic and technical point of view. For example, separator plates are usually made from graphite or a graphite composite and must be gas impermeable; it is expensive putting ribs in such a material. With regard to separate reservoir layers, additional components in a cell package always means increased fabrication and materials costs. Additionally, when separate reservoir layers are used the reactant gas, in order to reach the catalyst layer, must pass through both the partially filled (i.e., with electrolyte) reservoir layer and the electrode substrate. Usually holes or wetproofed areas are required in the reservoir layers to reduce diffusion losses; however, this increases the cost of fabricating the reservoir layers. The thickness of the reservoir layers must also be kept to a minimum for the purpose of reducing these diffusion losses, despite the fact that this restricts the amount of excess electrolyte which can be handled by the cell.

SUMMARY OF THE INVENTION

An object of the present invention is to provide a novel electrochemical cell electrode substrate.

Another object of the present invention is to eliminate the need for ribs in separator plates used in a stack of electrochemical cells and in particular fuel cells.

A further object of the present invention is the elimination of the need for a separate reservoir layer in a fuel cell.

Accordingly, a novel electrochemical cell electrode substrate is provided comprising a gas porous substrate having ribs of hydrophilic material on one side thereof forming grooves between said ribs, and a substantially flat surface on the other side thereof adapted to have a catalyst layer disposed thereon. In a stack of electrochemical cells such as fuel cells, at least one and preferably both of the two electrodes of each cell includes such a ribbed substrate. A flat, gas impermeable plate separates the electrodes of adjacent cells, the ribs of each ribbed substrate abutting a surface of one of the plates forming channels for carrying reactant gas across the cell.

As hereinafter discussed, electrolyte is stored in the ribs and moves to and from the electrolyte matrix by capillary action. In a preferred embodiment the substrate is wetproofed in virtually all areas except within the ribs such that the webs or substrate material between ribs remain totally free of electrolyte for easier gas diffusion therethrough.

One advantage of these electrodes and fuel cells incorporating them is that they can be made less thick while having a larger electrolyte storage capacity then some prior art designs.

Another advantage of the present invention is the lower cost of porous ribbed substrates as compared to ribbed gas impermeable separator plates.

Another advantage of the present invention is the elimination of separate provisions for electrlyte storage since this provision is a part of the electrode substrate in the present invention.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
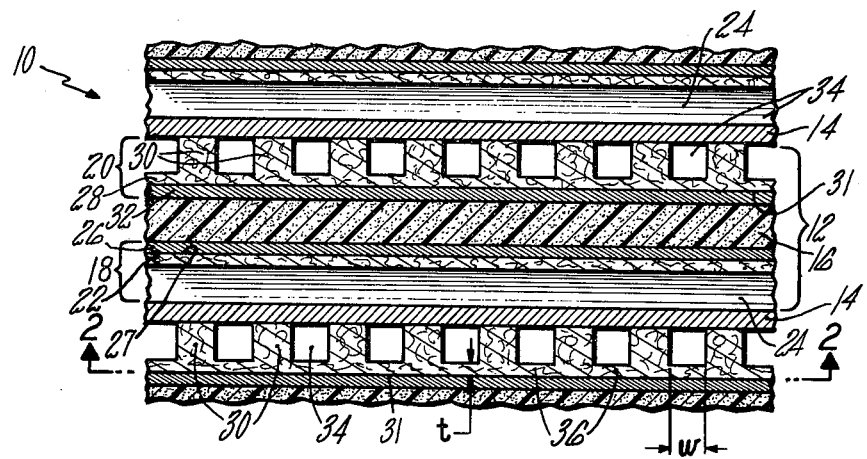
FIG. 1 is a cross section of a fuel cell stack, not to scale.

FIG. 1 is a cross-sectional view of part of a fuel cell stack 10. Each stack 10 is comprised of a pluarlity of fuel cells 12 separated by flat gas impermeable separator plates 14. The plates 14 may be made by any known method and of any material which is compatible with and can withstand the operating environment within the cell. One method for making plates 14 for use in a phosphoric acid fuel cell is described in copending, commonly owned U.S. patent application Ser. No. 824,760 METHOD FOR MAKING A MOLDED ALL CARBON ARTICLE by L. Christner, J. Harrington, and D. Nagle filed on even date herewith.

Each cell 12 includes an electrolyte retaining matrix layer 16 having an anode electrode 18 disposed on one side thereof and a cathode electrode 20 disposed on the other side thereof. If phosphoric acid is the electrolyte, the matrix preferaly is silicon carbide with a binder such as polytetrafluoroethylene as shown and describe in commonly owned U.S. Pat. No. 4,017,664 by R. Breault. The anode electrode 18 comprises a substrate 22 having ribs 24 extending thereacross (parallel to the plane of the paper as shown in the drawing) on one side thereof forming grooves therebetween, and a catalyst layer 26 disposed on the flat, continuous, nonribbed side 27 thereof. The cathode electrode 20 includes a substrate 28 having ribs 30 extending thereacross (perpendicular to the plane of the paper as shown in the drawing) on one side thereof forming grooves therebetween, and a catalyst layer 32 disposed on the flat, continuous, nonribbed side 31 thereof. As will be hereinafter explained in further detail, both ribbed substrates 22, 28 of this exemplary embodiment are selectively wetproofed such that the majority of the volume and specifically the ribs 24, 30 remain hydrophilic; however, it is within the scope of the present invention that one of the substrates of each cell be completely hydrophobic, and all electrolyte storage is accommodated by the other substrate.

The ribs 24, 30 of the anode and the cathode electrode substrates abut the separator plates 14; and the grooves therein form reactant gas channels 34 on each side of the separator plates 14. The ribs 24, 30 of each substrate are separated from each other by webs 36 having a width $w$ and a thickness $t$ from the flat surface of the substrate to the base of the grooves formed by the ribs. It is preferred to bond the substrates to the plates to improve electrical and thermal conductivity through the cell, but this is not required. A bonded structure comprising the separator plate 14 with the anode substrate 22 bonded to one side thereof and the cathode substrate 28 bonded to the other side thereof is a component which is easily handled when assembling a stack 10. The catalyst layers 26, 32 may be a part of that component. One method for bonding is to apply a thin layer of thermosetting resin to one or both of the contacting surfaces and to carbonize the resin by heating. Phenolic resin or other thermosetting resins having a carbon yield of at least about 30% are recommended. To reduce cost, if the manufacture of the separator plates and substrates require heating to carbonize them, the resin may be applied prior to such carbonization; the parts are then pressed together and heated in a single carbonizing step. This procedure may only be used if thermal expansion characteristics of the parts and adhesive are compatible.

Although it may be obvious, it should be made clear that although the plates 14 are described as flat plates, they need only be flat in their central operative area adjacent that portion of the electrodes wherein the electrochemical reaction occurs. They may be (but need not be) flat at their edges which generally are configured to seal the cells from gas and electrolyte leakage. The means for sealing the cells forms no part of the present invention and is therefore not shown in the drawing; any conventional sealing means may be used, such as the type of seal shown and described in commonly owned U.S. Pat. No. 3,867,206, which is incorporated herein by reference.

It should be apparent from the foregoing that the ribbed substrates 22, 28 serve a plurality of functions. First, they may serve as a substrate onto which a catalyst layer may be applied by any known technique. Note, however, it is only necessary that the substrate be in continuous contact with the catalyst layer; thus, the catalyst layer may instead be applied to the surface of the matrix layer 16. Second, the substrate serves as a reservoir for excess electrolyte. Third, the substrate forms channels 34 for carrying reactant gas across the cells. In addition to these functions, the reactant gas within the channels must be able to diffuse readily through the substrate to reach essentially all portions of the catalyst layer.

In view of these requirements the ribbed substrate must be a highly porous body, preferably at least 75% porous. Uniformity of the structure is also essential in order that the reactant is distributed uniformly over all of the catalyst layer. Most if not all of the pores should be larger than the pores of the matrix so that essentially only excess electrolyte will enter the substrate and be delivered to the matrix when needed. The substrate must be strong enough to withstand compressive stresses imposed by the stack construction. Also, it must be made relatively inexpensively and to close dimensional tolerances. Finally, it must be virtually inert to the electrolyte used in the cell at the operating conditions of the cell.

One method for making a ribbed substrate according to the present invention is from a mixture of phenolic resin and carbon fibers as described in copending, commonly owned U.S. Pat. application Ser. No. 824,758 titled METHOD FOR FABRICATING A RIBBED ELECTRODE SUBSTRATE by G. Sandelli and filed on even date herewith. The mixture is loaded into a molding die having the mirror image of the rib pattern desired in the substrate. To obtain a substrate having the hereinbefore discussed characteristics, a uniform, dry mixture comprising 20-50% thermosetting resin, by weight, and 80-50% carbon fibers, by weight, must be used. We prefer a phenolic resin in view of its low cost and relatively low molding temperatures. Much less than 20% resin may not provide the part with sufficient strength to withstand the stresses which are imposed on it during operation within a stack; however, in order to obtain high porosity a high fiber content is required. Since high porosity is essential, we prefer to use the maximum amount of fiber (i.e., 80%) and the minimum amount of resin (i.e., 20%)

Fiber length is also critical. If the fibers are too short it is difficult to obtain adequate porosity. Fibers which are too long tend to form clumps or aggregates in the mold; the strength of the finished part is reduced as a result thereof because it becomes very difficult if not impossible to obtain a good distribution of the molding mixture in the die. Blending the fibers and resin well, to form a uniform mixture, helps reduce the number and size of fiber aggregates. It is believed that the fiber length will have to be between 10 and 100 mils and preferably less than 50 mils; however, since even the smaller fiber lengths have a tendency to form aggregates if the mixture is poured directly into the die, we have found it desirable to sift the molding mixture into the die through a screen placed over the die.

The amount of mixture put into the die is predetermined so as to yield a part having the desired porosity when the mixture is pressed to a preset thickness. Pressure and heat and low pressure are simultaneously applied to the mixture in a manner calculated to obtain the desired thickness of the part and to at least partially cure the resin so that the part will retain its shape and thickness when the pressure is removed. We prefer to use a flat plate punch which is shimmed so that it bottoms out when the desired thickness of the part has been reached. By this technique any pressure high enough to cause the punch to bottom out is sufficient; excess pressure is taken by the shims and not the molding mixture. The temperature of the mixture need be raised only high enough to melt the resin and should not exceed the final cure temperature of the resin unless the molding step is done in an inert atmosphere. If the resin is a phenolic any temperature between 88° C. and 232° C. (200° F. and 450° F.) may be used when molding in an air environment.

The part is then removed from the die and is placed in a curing oven between flat plates to ensure that the part does not warp. The resin is then fully cured. If a phenolic resin is used this may be done by holding the part at 450° F. for 1 hour.

The part is then carbonized by heat treating in an inert atmosphere to at least 1100° C. to convert all the resin to carbon. Further heat treatment up to 2100° C. is recommended to assure removal of all impurities (mainly sulfur and copper) and to improve thermal and electrical properties.

At this point the part is all hydrophilic. In accordance with the teachings of commonly owned U.S. Pat. No. 4,035,551 ELECTROLYTE RESERVOIR FOR A FUEL CELL by P. E. Grevstad issued July 12, 1977, if the ribbed substrate has a range of pore sizes randomly distributed throughout with substantially no pores smaller than the largest pores of the matrix then there may be no need for any wetproofing of the substrate. Excess electrolyte will randomly distribute itself throughout the substrate including the webs as well as the ribs. In accordance with the teachings of the Grevstad application, adequate gas distribution through the substrate to the catalyst layer will still be obtained even if 60% of the void volume of the substrate is filled with excess electrolyte.

Figure 2:
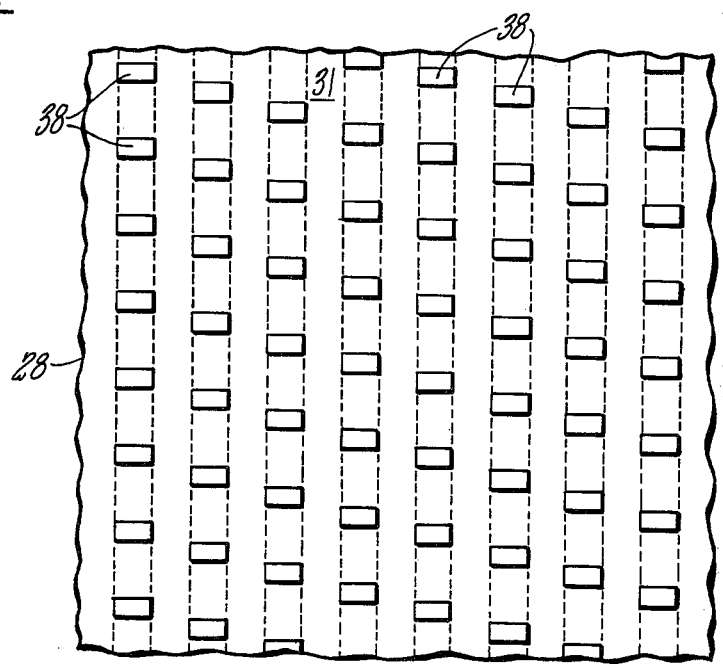
FIG. 2 is a sectional view taken along the line 2—2 of FIG. 1.

In this exemplary embodiment, however, it is preferred to selectively wetproof the substrate to keep diffusion losses to an absolute minimum. FIG. 2 shows the flat catalyst facing surface 31 of the ribbed substrate 28. This surface is impregnated, such as by screen printing, to a depth approximately equal to the thickness $t$ of the webs 36 with an aqueous solution of polytetrafluoroethylene (PTFE) except for select areas 38 which are aligned with the ribs 30. Thus, the ribs 30 remain hydrophilic as well as numerous paths or columns of material under the ribs leading from the surface 31 to the ribs. Although not shown in the drawing, the catalyst layer may (but need not) be provided with holes which are aligned with the areas 38 and which may be filled with hydrophilic material for aiding in the transfer of electrolyte between the matrix and the substrate. After the substrate is impregnated with the wetproofing material it is heated to drive off the inking vehicle and other volatiles which are present in the wet-proofing ink.

From the foregoing it is apparent that during fuel cell operation, in this exemplary embodiment, the webs 36 will remain free of electrolyte as well as the large majority of material under the ribs which has also been wetproofed. Thus, electrolyte storage is essentially only in the ribs. Also, since the amount of excess electrolyte relative to the rib volume will usually only partially fill the hydrophilic areas, reactant gas diffusion will occur throughout the void volume of the ribs and throughout the void volume of the hydrophilic areas under the ribs. Thus no area of the catalyst layer will be starved of reactant gas. We have found this to be substantially true even when the hydrophilic areas are 70% filled with electrolyte.

EXAMPLE

A large number of ribbed anode substrates were made having a web width $w$ of 0.094 inch, a web thickness $t$ of 0.015 inch, a rib width of 0.066 inch and a rib height of 0.070 inch. The total thickness of each substrate was thus 0.085 inch which is the sum of the rib height and the web thickness. To fabricate this substrate a molding compound was first prepared comprising 20% by weight of Reichhold 24-655 phenolic resin and 80% by weight carbon fibers purchased from Union Carbide as a Thornel ® mat (grade VMA). Thornel is Union Carbide's trademark for carbonized pitch fibers. Since the carbon fiber was purchased in the form of a mat it was first chopped using a Wiley mill so that the fibers had a nominal length of from 10 to 25 mils. These fibers happened to have a nominal diameter of about 9 microns; however, fiber diameter is not considered critical. The phenolic resin was blended with the chopped carbon fibers in a V-blender for ½ hour. The mixture was again passed through the Wiley mill to assure a thorough and uniform blend of the components. An amount of the molding compound sufficient to yield a part having an average porosity of about 80% (density of approximately 1.78 g/cc) was sifted through a 60 mesh screen directly into the die which was at room temperature. A flat plate punch was applied to the mixture using a pressure of 150 psi, and the mold was heated such that the coolest section of the die was at least 134° C. (300° F.). This temperature was held for ten minutes and the pressure was then released. Although 150 psi pressure was applied by the punch, the punch was shimmed so that it would compact the mixture to the desired thickness of 0.085 inch, which means that the molding mixture was not receiving the full 150 psi pressure. The part was removed from the mold and postcured in an inert atmosphere in a dispatch oven at 232° C. (450° F.) for 1 hour. The temperature was increased at a rate of 50° C. per hour (90° F. per hour) to 815° C. (1500° F.) and was further increased from 815° C. to 1092° C. (1500° F. to 2000° F.) as fast as possible and held at 1092° C. for 1 hour. The part was then allowed to cool (although this was not necessary) and was then further heat treated to 2100° C. (3812° F.). The part had a porosity of approximately 65% in the web areas and 90% in the ribs. The flat side of the substrate was then impregnated with PTFE using a screen printing process and a pattern very similar to that shown in FIG. 2. The total area of the surface which was not impregnated with PTFE amounted to only about 12.5% of the total surface area. The screen printing ink used in this example was comprised of 44% Dupont's TFE-30 (an aqueous suspension of 60% PTFE with a surfactant), 0.3% B. F. Goodrich's Carbopol ® (a thickening agent), 55% water, and 0.2% ammonium hydroxide to gel the Carbopol. (All percentages are by weight). After impregnation the part was heated to 349° C. (660° F.) for 15 minutes to remove the volatiles and to sinter the PTFE.

The ribbed substrate of the foregoing example has approximately twice the storage capacity (in the ribs) of a continuous 15 mil thick flat 100% hydrophilic reservoir layer of the prior art used with a ribbed separator plate. This is true in addition to and despite the fact that a ribbed substrate with a flat separator plate permits the cell to be made somewhat thinner than in the prior art. Note, also, to reach the catalyst layer in the areas of the webs the reactant gas need only diffuse through a 15 mil thickness of material which, in the exemplary embodiment, contains no electrolyte since the webs are wet-proofed. Reactant gas also diffuses readily into the wet-proofed areas under the ribs as well as through the void volume of the partially filled (with electrolyte) hydrophilic areas. Therefore, virtually no areas of the catalyst layer are starved of reactant. Theoretically, 100% of the rib volume can be used to store electrolyte with only a minimal performance penalty. We prefer a maximum of 70%.

Another method for making substrates is disclosed in commonly owned U.S. patent application Ser. No. 824,751 titled METHOD FOR FABRICATING AN ELECTRODE SUBSTRATE by L. Christner, D. Nagle and P. Watson, filed on even date herewith. While the method described therein is directed to making flat substrates, grooves could be machined on one side to form the ribs.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. An electrochemical cell stack comprising a plurality of cells, adjacent cells being separated by a gas impermeable separator plate having substantially flat opposing surfaces, each cell comprising an electrolyte retaining matrix layer and a catalyst layer on each side of said matrix layer and in contact therewith, each cell also including a pair of gas porous substrates, a substrate being adjacent the nonmatrix facing side of each of said catalyst layers, said substrates comprising 50-80% carbon fibers and 20-50% carbonized resin, each substrate including a first side having hydrophilic ribs defining grooves therebetween extending across said substrate and a second side opposed to said first side and having a substantially flat surface, each of said grooves having a base, said flat surface of each of said substrates being in contact with its respective adjacent catalyst layer, said ribs of each of said substrates being in continuous contact with the flat surface of the separator plate adjacent thereto, the majority of the volume of said substrates being hydrophilic, said substrates being at least 75% porous and including a plurality of paths of hydrophilic material aligned with each rib, said paths of hydrophilic material extending from said flat surface of said substrate to said aligned hydrophilic ribs, said substrate being hydrophobic from said flat surface to the base of said grooves except for said plurality of paths of hydrophilic material aligned with each rib.

* * * * *